United States Patent
Fahlman et al.

[11] Patent Number: 5,960,080
[45] Date of Patent: Sep. 28, 1999

[54] METHOD FOR TRANSFORMING MESSAGE CONTAINING SENSITIVE INFORMATION

[75] Inventors: Scott E. Fahlman; Rahul Sukthankar; Antoine Brusseau, all of Pittsburgh, Pa.

[73] Assignee: Justsystem Pittsburgh Research Center, Pittsburgh, Pa.

[21] Appl. No.: 08/966,411

[22] Filed: Nov. 7, 1997

[51] Int. Cl.[6] ................................................ H04L 9/00
[52] U.S. Cl. ............................ 380/4; 380/59; 707/530; 707/531; 707/534; 707/536; 707/540; 707/523; 704/2; 704/5
[58] Field of Search ................... 395/187.01, 188.01, 395/707, 186, 705, 183.15, 683, 823, 898, 200.33, 700.36; 380/5, 51, 55, 56, 59; 340/825.3; 379/88.08, 88.14, 88.16; 704/1–10, 201–203, 254; 706/47; 707/4, 101, 500, 514–516, 523, 530–538, 540; 705/18

[56] References Cited

U.S. PATENT DOCUMENTS

| | | | |
|---|---|---|---|
| 4,580,218 | 4/1986 | Raye ........................................ 364/300 |
| 4,814,988 | 3/1989 | Shiotani et al. ........................... 52/364 |
| 4,962,452 | 10/1990 | Nogami et al. ............................ 52/364 |
| 4,991,094 | 2/1991 | Fagan et al. .............................. 364/419 |
| 5,005,127 | 4/1991 | Kugimiya et al. ........................ 364/419 |
| 5,243,519 | 9/1993 | Andrews et al. ......................... 364/419 |
| 5,276,616 | 1/1994 | Kuga et al. .......................... 364/419.08 |
| 5,295,068 | 3/1994 | Nishino et al. ........................... 364/419 |
| 5,423,032 | 6/1995 | Byrd et al. ................................ 395/600 |
| 5,471,611 | 11/1995 | McGregor ................................ 395/600 |
| 5,497,319 | 3/1996 | Chong et al. ............................. 364/419 |
| 5,500,796 | 3/1996 | Black ................................... 364/419.08 |
| 5,523,946 | 6/1996 | Kaplan et al. ....................... 364/419.02 |
| 5,526,443 | 6/1996 | Nakayama ................................ 382/229 |
| 5,577,209 | 11/1996 | Boyle et al. ......................... 395/200.06 |
| 5,579,223 | 11/1996 | Raman ...................................... 395/751 |
| 5,587,902 | 12/1996 | Kugimiya ................................. 395/752 |
| 5,619,410 | 4/1997 | Emori et al. ............................. 395/757 |
| 5,625,773 | 4/1997 | Bespalko et al. ........................ 395/167 |
| 5,692,124 | 11/1997 | Holden et al. ....................... 395/187.01 |
| 5,721,939 | 2/1998 | Kaplan ..................................... 395/759 |
| 5,765,176 | 6/1998 | Bloomberg .............................. 707/514 |
| 5,796,948 | 8/1998 | Cohen ................................. 395/200.36 |
| 5,799,268 | 8/1998 | Boguraev ..................................... 704/9 |
| 5,819,265 | 10/1998 | Ravin et al. ................................. 705/5 |
| 5,822,435 | 10/1998 | Beobert et al. ............................ 380/49 |
| 5,828,832 | 10/1998 | Holden et al. ....................... 395/187.01 |
| 5,832,227 | 11/1998 | Anderson et al. .................. 395/200.54 |
| 5,848,386 | 12/1998 | Motoyama ................................... 704/5 |

*Primary Examiner*—Tod R. Swann
*Assistant Examiner*—Paul E. Callahan
*Attorney, Agent, or Firm*—Webb Ziesenheim Logsdon Orkin & Hanson, P.C.

[57] ABSTRACT

A method for transforming an original message into a final message by including an untrusted service, includes the steps of identifying at least one sensitive term from the original message; replacing the at least one sensitive term with a standard token to create a sanitized message; storing the at least one sensitive term; transmitting the sanitized message to a provider of the untrusted service; performing the untrusted service on the sanitized message to create a serviced message; merging the serviced message with the at least one sensitive term stored in the storing step to create the final message.

36 Claims, 6 Drawing Sheets

METHOD FOR TRANSFORMING MESSAGE CONTAINING SENSITIVE INFORMATION

BACKGROUND OF THE INVENTION

1. Field of the Invention

The present invention relates to a method and apparatus for transforming a message containing sensitive information, and more particularly, to a method and apparatus for transforming a message by separating sensitive information from the message prior to an untrusted service, for example, a human-assisted translation service.

2. Discussion of the Related Art

One important issue in the communication field is to keep the confidentiality of information when such information is transmitted from one party at a specific location to another party at a different location. This is especially so when information is transmitted over electronic links. Business customers may not use a communication service unless the confidentiality of their messages can be maintained.

In general, various encryption techniques have been developed to ensure that the confidentiality of information is maintained during transmission. However, if any untrusted services are required during the transmission process, the security level of the communication service is compromised and confidentiality of the information is not guaranteed.

One typical example of an untrusted service is when a human-assisted translation service is required during the transmission process. If an original message is composed in the native language of the sender of the message, the message needs to be translated by a translation service before it can be forwarded to the intended recipient. The conventional encryption techniques will not guarantee the confidentiality of the message under such circumstances.

Since fully automatic translation techniques are not yet available for providing high quality translations from one language to another, a bilingual human translator is generally employed to translate the message or at least to check and correct the machine translation. As a result, the human translator must see the message in its decrypted form. This creates a potential security leak. One option is to chop the message into many small pieces, and employ a different human translator to work on each piece. This is undesirable because the translator needs to see a large enough portion of the message to understand the proper context for the message so that he can provide the high quality translation. This in turn defeats the purpose of chopping the message. Although the translators are usually subject to non-disclosure agreements, potential risks for sensitive information leaking remain and often are viewed undesirable by business customers.

In addition, even an automated service, such as an automatic grammar checker or style checker, may create potential security leak under certain circumstances if the automated service has access to the full content of a message. For example, a substantial portion of the message may show up on a screen during the processing and a bystander may see that portion.

SUMMARY OF THE INVENTION

Accordingly, the present invention is directed to a method and an apparatus for transforming a message that substantially obviates one or more of the problems due to limitations and disadvantages of the related art.

An object of the present invention is to provide a method and an apparatus for transforming a message by separating sensitive information from the message prior to an untrusted service, so that the confidentiality of the information is maintained.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, the method according to the present invention for transforming an original message into a final message by including an untrusted service includes the steps of identifying at least one sensitive term from the original message; replacing the at least one sensitive term with a standard token to create a sanitized message; storing the at least one sensitive term; transmitting the sanitized message to a provider of the untrusted service; performing the untrusted service on the sanitized message to create a serviced message; merging the serviced message with the at least one sensitive term stored in the storing step to create the final message.

In another aspect, the apparatus according to the present invention for transforming an original message created at a source terminal into a final message for delivering to a destination terminal by including an untrusted service, includes means at the source terminal for identifying at least one sensitive term from the original message; means at the source terminal for replacing the at least one sensitive term with a standard token to create a sanitized message; means at the source terminal for storing the at least one sensitive term; means for transmitting the sanitized message to a provider of the untrusted service, thereby creating a serviced message; means for transmitting the serviced message from the untrusted service to the destination terminal; means for transmitting the at least one sensitive term stored in the storing step from the source terminal to the destination terminal; and means at the destination terminal for merging the serviced message with the at least one sensitive term to create the final message.

In a further aspect, the method of the present invention for efficiently transmitting a confidential message, includes the steps of preparing an original confidential message; identifying at least one sensitive term from the original confidential message; replacing the at least one sensitive term with a standard token to create a sanitized message; storing the at least one sensitive term; transmitting the sanitized message with a first level of security; transmitting the at least one sensitive term stored in the storing step with a second level of security, the second level of security being more secure than the first level of security; receiving the sanitized message and the at least one sensitive term; and merging the sanitized message with the at least one sensitive term to create a final confidential message.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
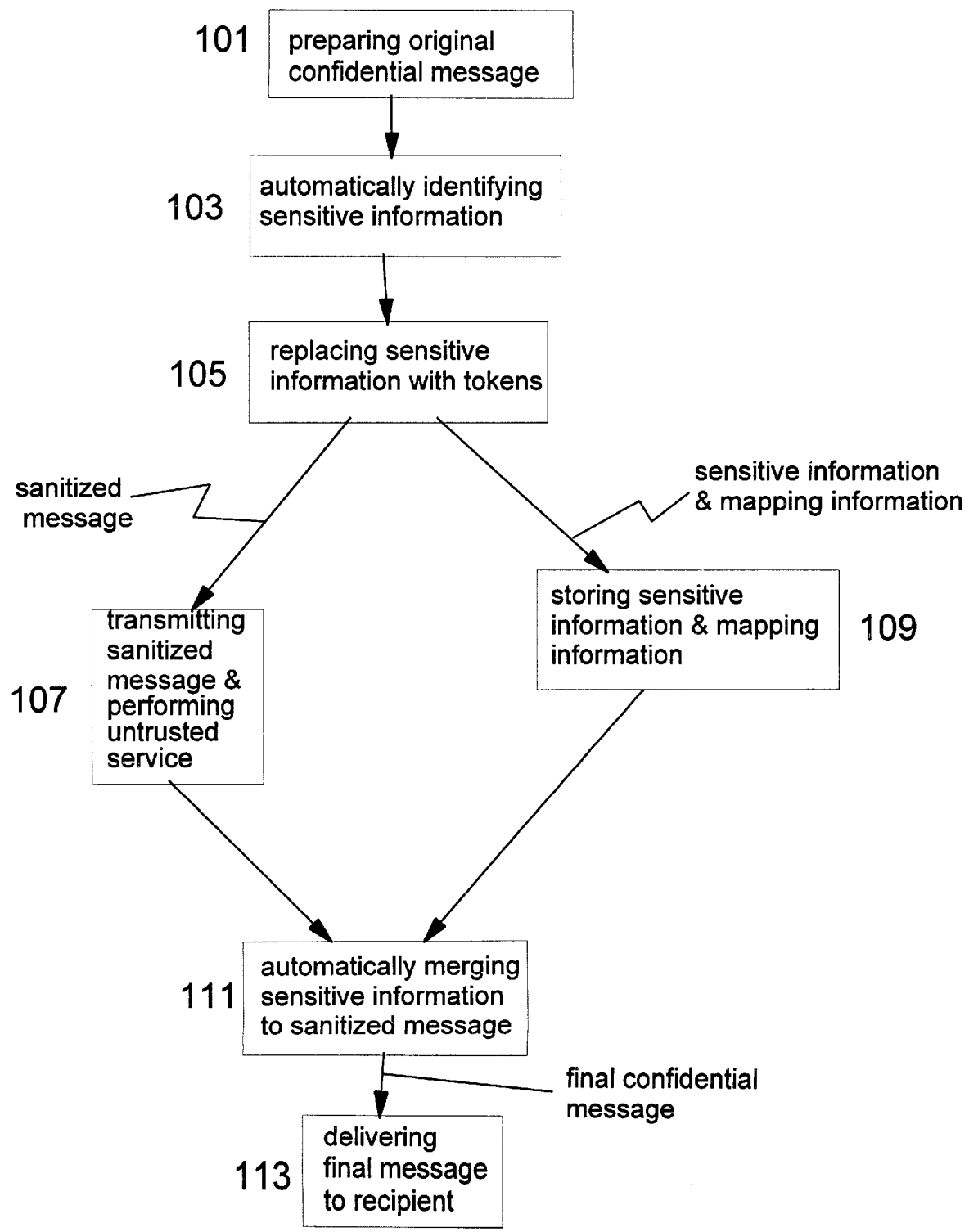
FIG. 1 is a flow chart illustrating a method for transforming and transmitting a confidential message in accordance with a first embodiment of the present invention.

The first embodiment of the present invention relates to a method for efficiently transmitting a confidential message and is shown in FIG. 1.

Referring to FIG. 1, the method for efficiently transmitting a confidential message includes a first step 101 of preparing an original confidential message by a sender. For example, the sender could prepare a textual message through a keyboard connected to a personal computer, or a voice message through a microphone, or any other suitable types of messages through various appropriate devices.

Next, as shown in step 103, sensitive terms and their respective locations in the original confidential message, i.e., those terms containing sensitive information, are identified by a suitable computer program algorithm. For example, programs employing heuristic rules or lexical techniques can be used for this purpose. An algorithm using heuristic rules typically searches for patterns in a text which are likely to indicate the presence of sensitive terms. This includes, but is not limited to, a pattern matching approach looking for capitalized terms, such as proper names, places, etc. An algorithm using lexical techniques generally checks a text against a defined list of sensitive terms, such as known places, known names, dollar ($) signs, etc.

In step 105, the identified sensitive terms are replaced with standard tokens. For example, the sensitive term "Mr. Johnson" is replaced by the standard token <person-1>, and the term "Jul. 1, 1997" is replaced by <date-1>. As a result, a sanitized message including various standard tokens is generated in step 105.

The sanitized message is then transmitted with a low level of security since the sanitized message only contain standard tokens, not sensitive information. For example, an untrusted service may be performed to the sanitized message and this reduces the security level. Also, an user may choose not to use an encryption program, or use a low security level encryption program with the sanitized message.

The sensitive terms are stripped from the original confidential message. The stripped sensitive terms and their respective locations, i.e., the mapping information, are stored either together with the sanitized message or in a separate location from the sanitized message. In step 109, the thus stored sensitive terms and the mapping information are transmitted with a high level of security.

Then, in step 111, the sensitive terms received from the second path are merged with the sanitized message to create a final confidential message.

Finally, in step 113, the final confidential message is delivered to the intended recipient.

The high level of security for transmitting the sensitive terms can be achieved through the use of suitable encryption techniques. In contrast, when an untrusted service is needed for the sanitized message, the security level is often low since either encryption techniques are not used, or encrypted text has to be decrypted before performing the untrusted service. For example, when a human translator is required to translate the sanitized message, the encrypted text has to be decrypted before the human translator can perform the translation.

Figure 2:
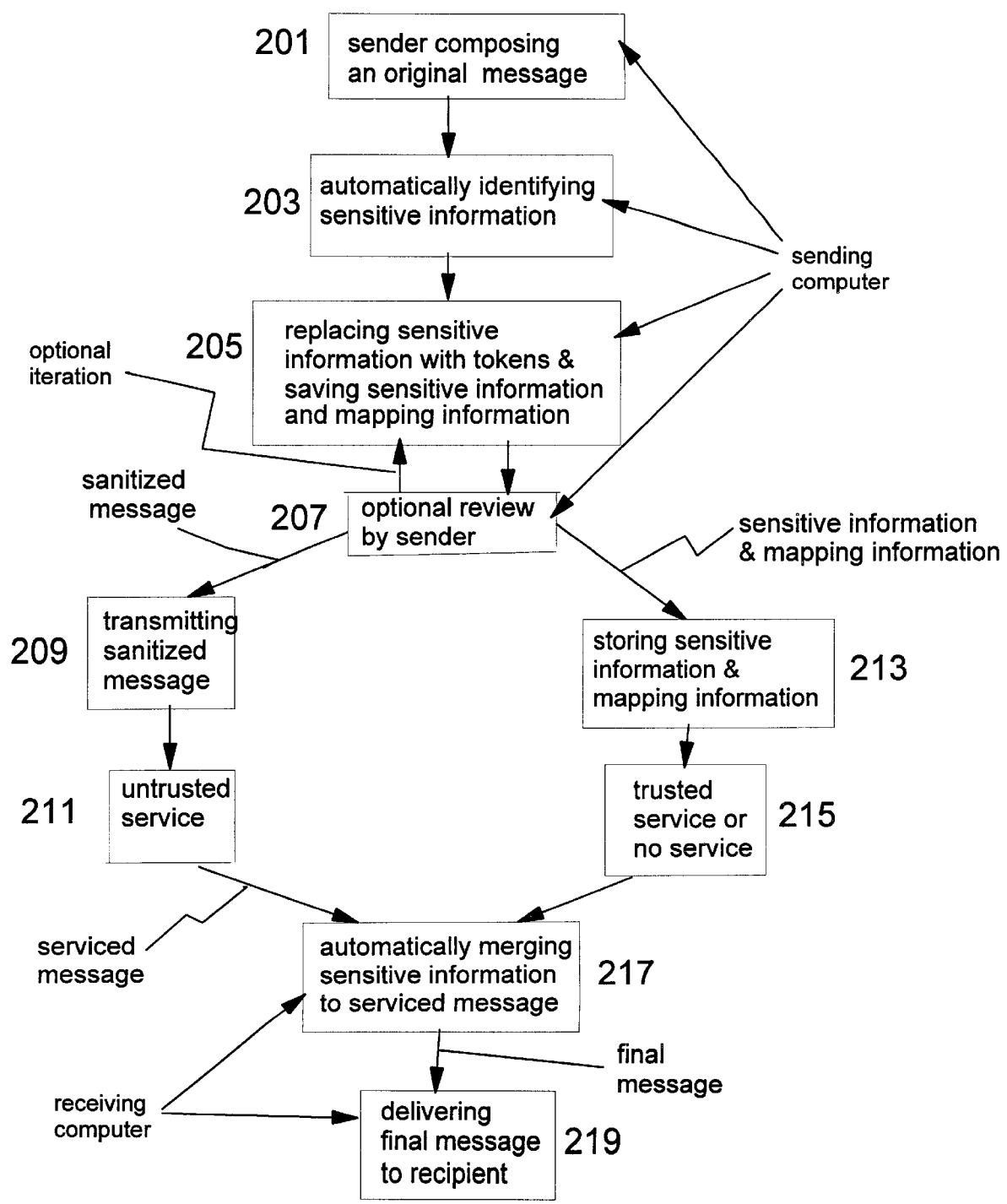
FIG. 2 is a flow chart illustrating a method for transforming and transmitting a confidential message in accordance with a second embodiment of the present invention.

Referring to FIG. 2, a second embodiment of the present invention relates to a method for transforming a message by separating sensitive information from the message prior to an untrusted service.

Initially, in step 201, a sender composes an original message which may include several sensitive terms, i.e., terms containing sensitive information. The sender can compose the original message by typing on the keyboard of a personal computer to generate a textual message, or by speaking to a microphone to generate a vocal message, or by video-taping a desired object to generate an image message.

Figure 3:
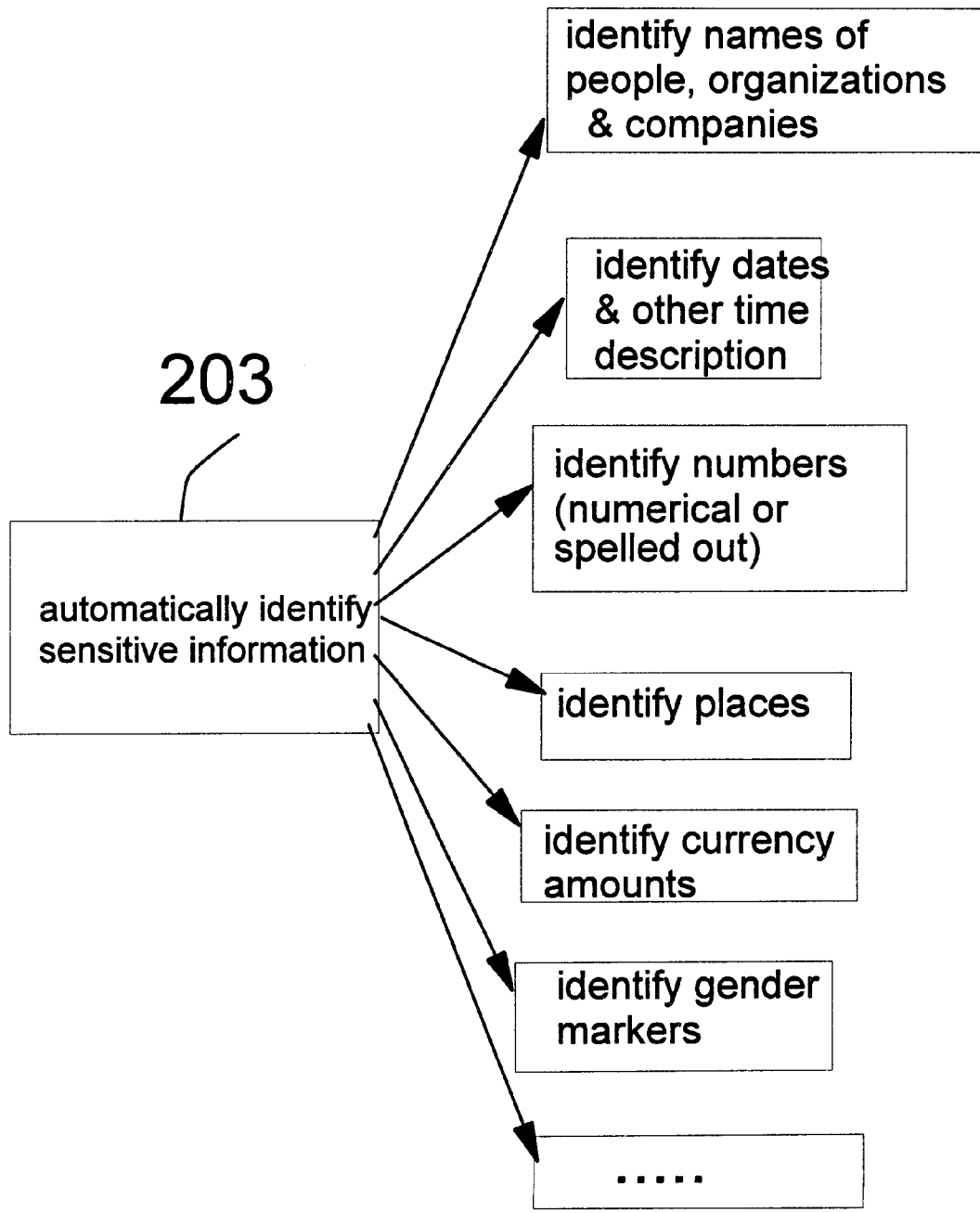
FIG. 3 is an illustration of the identifying sensitive information step of FIG. 2.

In step 203, sensitive terms are identified from the original message via a suitable computer program algorithm. Here, the sensitive terms are defined as any information which are viewed by the sender as sensitive or confidential. For illustrative purpose, FIG. 3 shows several examples of the sensitive terms: names of people or organizations, a particular transaction, any financial information related to a transaction, dates of transaction, company names, addresses of the parties, project names, gender markers such as "he", "she", "Mr." and "Ms.", etc.

Figure 4:
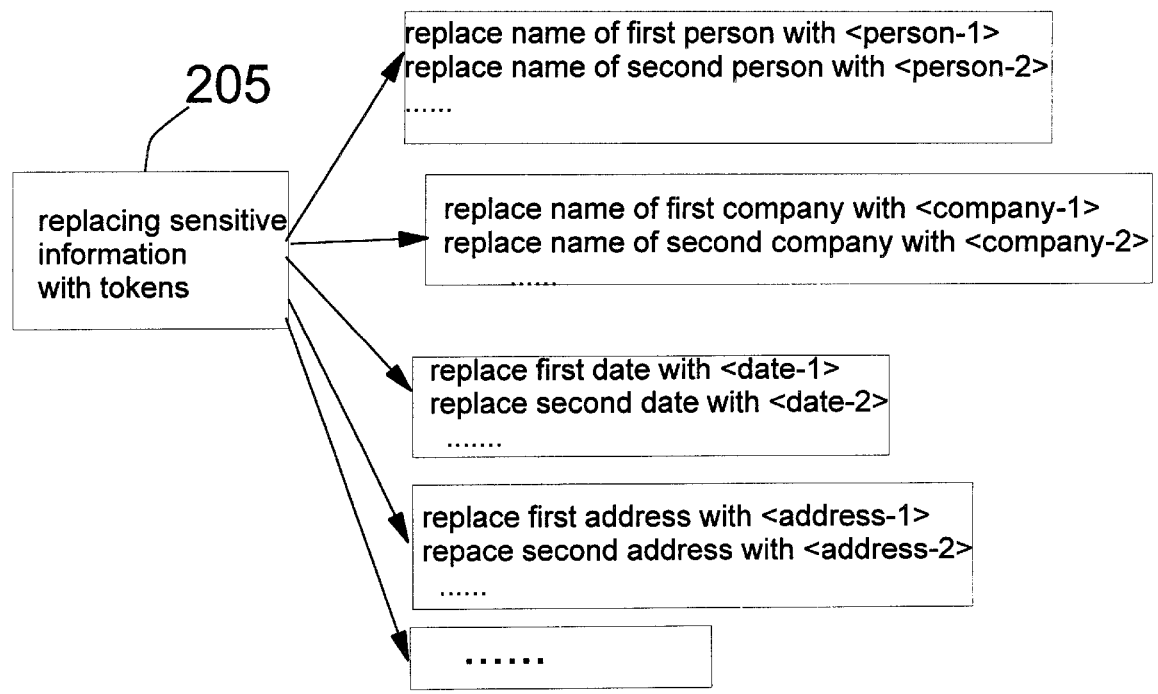
FIG. 4 is an illustration of the replacing sensitive information step of FIG. 2.

In step 205, the identified sensitive terms are replaced with standard tokens, such as <person-1>, <date-1>, <amount-2>, <address-3>, etc. In addition, the sensitive terms and the mapping information are saved in a file. As a result, a sanitized message including various tokens is generated. For illustrative purpose, FIG. 4 shows several examples of this operation: the term "Mr. Johnson" may be replaced by <person-1>, the term "XYZ Corporation" may be replaced by <company-1>, etc.

Step 207 shows an optional review capability by the sender of the original message. Sender can choose to review the sanitized message to decide whether a third party can ascertain the true meaning of the message by reading the sanitized message. If the sender is not satisfied with the sanitized message, he can then replace more terms with tokens, either manually or via a different subroutine. Alternatively, if too many tokens are used, the sender can choose to desanitize the message, i.e., to lower the security level, thereby improving the performance or efficiency of the process. The sender has the option to repeat the review process several times until he is satisfied with the sanitized message.

The steps 201, 203, 205, and 207 are generally performed by using a computer at the sender's location. But they can also be performed at several difference locations.

Once the sender is satisfied with the security level of the sanitized message, the sanitized message is transmitted in step 209 to an untrusted service for required service, for example, a human-assisted translation service. The transmission step 209 may occur along an electronic link, or by physical delivering of the sanitized message. For example, a printed hard copy of the sanitized message may be physically delivered to a translator.

In step 211, an untrusted service, such as a translation service, or a grammar checking or style checking service, is performed to the sanitized message to create a serviced message. This is where the confidentiality of the message gets compromised in the conventional art. However, since the sanitized message does not contain any sensitive information, and only contains standard tokens, the human translator or other recipients of the message are not exposed to any sensitive information. Therefore, there is no compromise of security standards in the present invention.

After the sensitive terms are stripped from the original message in step 205, the sensitive terms and the respective mapping information are stored either in a separate location, or together with the sanitized message, in step 213. If desired, a trusted service by either an automated service provider or a trusted human operator may be performed in step 215 on the sensitive information. For example, this can be accomplished by an automated translator given that most of the sensitive terms include only simple phrases. Often, no service at all is needed for the sensitive information. For example, numerical numbers, dollar amounts, and dates often do not need translation.

Figure 5:
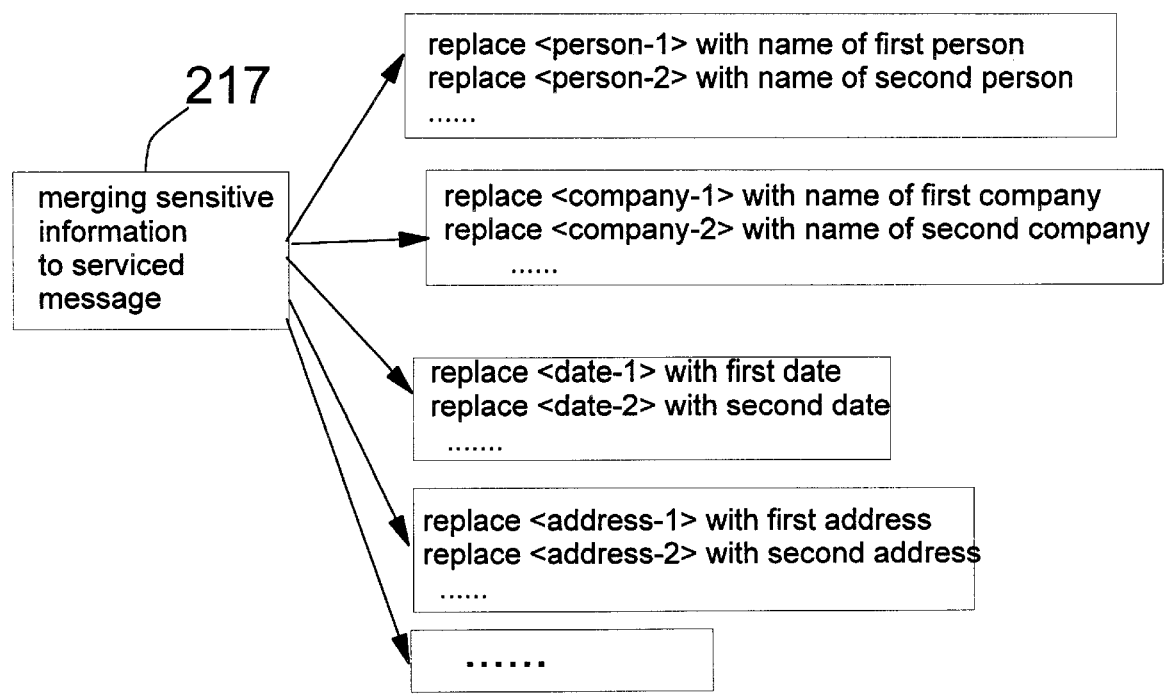
FIG. 5 is an illustration of the merging sensitive information to the serviced message step of FIG. 2.

Then, in step 217, the sensitive terms are automatically merged back into the serviced message to create a final message. In other words, as shown in FIG. 5, each standard token is replaced by the associated sensitive term, e.g., <person-1> is replaced by "Mr. Johnson", and <company-1> is replaced by "XYZ Corporation", etc.

Finally, in step 219, the final message is delivered to the intended recipient. During the entire transmission process, only the sender and the intended recipient have the opportunity to view the complete message including all sensitive terms. This assures the confidentiality of the message.

The steps 217 and 219 are generally performed by using a computer at the recipient's location. But they can also be performed at different locations.

A fictional example will now be described here showing a confidential message in its original form and in its sanitized form. The sanitized message created by step 205 and viewed by the translator goes as the following:

From: <person-1>
<company-1>
<address-1>
To: <person-2>
<company-2>
<address-2>
Dear. <person-2>,
I have interviewed <person-3> and believe that we should hire him at an annual salary of <dollars-1> commencing on <date-1>. He is, after all, the world's leading expert on <quoted-string-1>. His current employer, <company-3>, will not like this and may threaten to sue. But we have learned that they will soon be the subject of an anti-trust complaint filed by <company-4>, so their legal staff will have more important things to worry about.
Sincerely,
<person-1>

From this sanitized message, the translator is not able to figure out the parties involved in this communication. Thus, the confidentiality of the original message, which goes as the follows, is maintained:
From: A. Johnson XYZ Corporation
Seattle, Wash.
To: B. Smith
ABC Firm
Washington, D.C.
Dear. Mr. Smith,
I have interviewed Mr. C. Williams and believe that we should hire him at an annual salary of $80,000 commencing on Jul. 7, 1997. He is, after all, the world's leading expert on fluid dynamics. His current employer, SSS Corporation, will not like this and may threaten to sue. But we have learned that they will soon be the subject of an anti-trust complaint filed by TTT Corporation, so their legal staff will have more important things to worry about.
Sincerely,
A. Johnson FIG. 6 shows an exemplary embodiment of the apparatus for transforming an original message created at a source terminal into a final message for delivering to a destination terminal by including an untrusted service.

Figure 6:
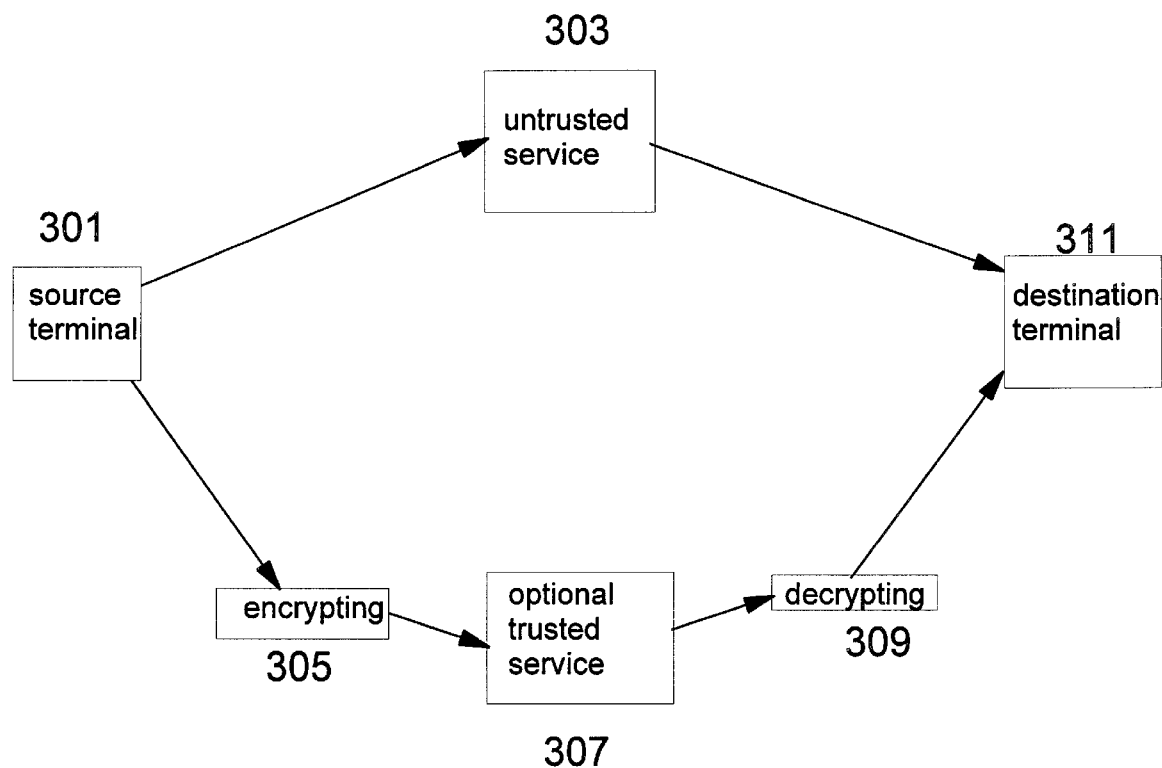
FIG. 6 is an apparatus for transforming a message for transmission from a source terminal to a destination terminal in accordance with the present invention.

As shown in FIG. 6, a sender generates an original message at a source terminal 301. The source terminal 301 could be a personal computer including an input device such as a keyboard, a central processing unit, a video monitor and a memory device. The source terminal 301 can also be a microphone for generating vocal data, or a video camera for generating image data, or any other appropriate well-known devices for generating different combination of data.

The apparatus also include identifying means, which may be either computer program subroutines, or any other appropriate algorithms, for identifying sensitive terms contained in the original message. As mentioned earlier, programs employing heuristic rules or lexical techniques may be used for this purpose.

The apparatus also includes replacing means, which could be another subroutine or various combination of algorithms, for replacing the identified sensitive terms with standard tokens, thereby creating a sanitized message.

Storing means, such as a memory device, a CD Rom, or a diskette, is provided at the source terminal 301 for storing the sensitive terms stripped from the original message and the respective mapping information.

The apparatus includes a link for transmitting the sanitized message to a provider of an untrusted service 303, such as a translation service. This creates a service message. The service message is then transmitted through the link to a destination terminal 311 of the apparatus. The sensitive terms stripped from the original message and the respective mapping information may be transmitted from the source terminal 301 to the destination terminal 311 either through the same link as that used by the sanitized message, or through a difference link.

In general, a high security level is provided for the transmission of the sensitive terms. As an option, encryption techniques can be used to maintain the required high level security. As another option, a trusted service, for example, a service provided by an automated service provider or a trusted human operator, can be performed on the sensitive terms. Since no untrusted service is involved with respect to the processing of the sensitive terms, the high level of security is maintained.

The apparatus further includes merging means at the destination terminal for merging the sensitive terms to the serviced message to create a final message. The merging means may be either a computer program subroutine, or other appropriate algorithms. The intended recipient of the message then receives the final message from the destination termination. Similar to the source terminal, the destination terminal could be a personal computer including a video monitor, a central processing unit, a keyboard, a memory device such as a CD Rom or diskette or hard memories. The destination terminal may also be a video player which shows image data, or a sound player which plays the voice data.

It will be apparent to those skilled in the art that various modifications and variations can be made in the method and apparatus of transforming a message of the present invention without departing from the spirit or scope of the invention. Thus, it is intended that the present invention cover the modifications and variations of this invention provided they come within the scope of the appended claims and their equivalents.

What is claimed is:

1. A method for transforming an original message into a final message by including an untrusted service, the method comprising the steps of:

identifying a plurality of classes of sensitive terms from the original message;

replacing each of the plurality of classes of sensitive terms with a unique token to create a sanitized message;

storing the plurality of classes of sensitive terms;

transmitting the sanitized message to a provider of the untrusted service;

performing the untrusted service on the sanitized message to create a serviced message; and merging the serviced message with the plurality of classes of sensitive terms stored in the storing step to create the final message.

2. The method of claim 1, wherein the identifying step includes identifying at least one of an address, a number, a time, a date and a name.

3. The method of claim 1, wherein the storing step includes storing the plurality of classes of sensitive terms into a memory device.

4. The method of claim 1, wherein the transmitting step includes transmitting the sanitized message electronically.

5. The method of claim 1, further comprising the step of sending the sanitized message to a sender of the original message for reviewing.

6. The method of claim 1, wherein the original message includes textual data.

7. The method of claim 1, wherein the original message includes voice data.

8. The method of claim 1, wherein the original message includes image data.

9. A method for transforming an original message into a final message by including an untrusted service, the method comprising the steps of:

identifying at least one sensitive term from the original message;

replacing the at least one sensitive term with a standard token to create a sanitized message;

storing the at least one sensitive term;

transmitting the sanitized message to a provider of the untrusted service;

performing the untrusted service on the sanitized message by translating the sanitized message from a first language to a second language to create a serviced message; and merging the serviced message with the at least one sensitive term stored in the storing step to create the final message.

10. The method of claim 9, wherein the identifying step includes identifying at least one of an address, a number, a time, a date and a name.

11. The method of claim 9, wherein the storing step includes storing the at least one sensitive term into a memory device.

12. The method of claim 9, wherein the transmitting step includes transmitting the sanitized message electronically.

13. The method of claim 9, further comprising the step of sending the sanitized message to a sender of the original message for reviewing.

14. The method of claim 9, wherein the original message includes textual data.

15. The method of claim 9, wherein the original message includes voice data.

16. The method of claim 9, wherein the original message includes image data.

17. A method for transforming an original message into a final message by including an untrusted service, the method comprising the steps of:

identifying at least one sensitive term from the original message;

replacing the at least one sensitive term with a standard token to create a sanitized message;

storing the at least one sensitive term;

transmitting the sanitized message to a provider of the untrusted service;

performing the untrusted service on the sanitized message to create a serviced message; and merging the serviced message with the at least one sensitive term stored in the storing step to create the final message, wherein the merging step includes the steps of:

identifying the standard token;

matching the standard token with the at least one sensitive term stored in the storing step; and replacing the standard token with the at least one sensitive term to create the final message.

18. A method for transforming an original message into a final message by including an untrusted service, the method comprising the steps of:

identifying at least one sensitive term from the original message;

replacing the at least one sensitive term with a standard token to create a sanitized message;

storing the at least one sensitive term;

transmitting the sanitized message to a provider of the untrusted service;

performing the untrusted service on the sanitized message to create a serviced message; and merging the serviced message with the at least one sensitive term stored in the storing step to create the final message, wherein the merging step includes the steps of:

performing a trusted service on the at least one sensitive term stored in the storing step to create a serviced at least one sensitive term; and inserting the serviced at least one sensitive term to the serviced message to create the final message.

19. An apparatus for transforming an original message into a final message by including an untrusted service, the apparatus comprising:

means for identifying a plurality of classes of sensitive terms from the original message;

means for replacing each of the plurality of classes of sensitive terms with a unique token to create a sanitized message;

means for storing the plurality of classes of sensitive terms;

means for transmitting the sanitized message to a provider of the untrusted service;

means for performing the untrusted service on the sanitized message to create a serviced message; and means for merging the serviced message with the plurality of classes of sensitive terms stored in the storing means to create the final message.

20. The apparatus of claim 19, wherein the identifying means includes means for identifying at least one of an address, a number, a time, a date and a name.

21. The apparatus of claim 19, wherein the storing means includes means for storing the plurality of classes of sensitive terms into a memory device.

22. The apparatus of claim 19, wherein the transmitting means includes means for transmitting the sanitized message electronically.

23. The apparatus of claim 19, further comprising the means for sending the sanitized message to a sender of the original message for reviewing.

24. The apparatus of claim 19, wherein the original message includes textual data.

25. The apparatus of claim 19, wherein the original message includes voice data.

26. The apparatus of claim 19, wherein the original message includes image data.

27. An apparatus for transforming an original message into a final message by including an untrusted service, the apparatus comprising:

means for identifying at least one sensitive term from the original message;

means for replacing the at least one sensitive term with a standard token to create a sanitized message;

means for storing the at least one sensitive term;

means for transmitting the sanitized message to a provider of the untrusted service;

means for performing the untrusted service on the sanitized message by translating the sanitized message from a first language to a second language to create a serviced message; and means for merging the serviced message with the at least one sensitive term stored in the storing means to create the final message.

28. The apparatus of claim 27, wherein the identifying means includes means for identifying at least one of an address, a number, a time, a date and a name.

29. The apparatus of claim 27, wherein the storing means includes means for storing the at least one sensitive term into a memory device.

30. The apparatus of claim 27, wherein the transmitting means includes means for transmitting the sanitized message electronically.

31. The apparatus of claim 27, further comprising the means for sending the sanitized message to a sender of the original message for reviewing.

32. The apparatus of claim 27, wherein the original message includes textual data.

33. The apparatus of claim 27, wherein the original message includes voice data.

34. The apparatus of claim 27, wherein the original message includes image data.

35. An apparatus for transforming an original message into a final message by including an untrusted service, the apparatus comprising:

means for identifying at least one sensitive term from the original message;

means for replacing the at least one sensitive term with a standard token to create a sanitized message;

means for storing the at least one sensitive term;

means for transmitting the sanitized message to a provider of the untrusted service;

means for performing the untrusted service on the sanitized message to create a serviced message; and means for merging the serviced message with the at least one sensitive term stored in the storing means to create the final message, wherein the merging means includes:

means for identifying the standard token;

means for matching the standard token with the at least one sensitive term stored in the storing means; and means for replacing the standard token with the at least one sensitive term to create the final message.

36. An apparatus for transforming an original message into a final message by including an untrusted service, the apparatus comprising:

means for identifying at least one sensitive term from the original message;

means for replacing the at least one sensitive term with a standard token to create a sanitized message;

means for storing the at least one sensitive term;

means for transmitting the sanitized message to a provider of the untrusted service;

means for performing the untrusted service on the sanitized message to create a serviced message; and means for merging the serviced message with the at least one sensitive term stored in the storing means to create the final message, wherein the merging means includes:

means for performing a trusted service on the at least one sensitive term stored in the storing means to create a serviced at least one sensitive term; and means for inserting the serviced at least one sensitive term to the serviced message to create the final message.

* * * * *